United States Patent
Ben-Zedeff et al.

(10) Patent No.: US 9,532,001 B2
(45) Date of Patent: Dec. 27, 2016

(54) SYSTEMS, METHODS, AND MEDIA FOR PROVIDING SELECTABLE VIDEO USING SCALABLE VIDEO CODING

(75) Inventors: Sagoo Ben-Zedeff, Givataim (IL); Yair Wiener, Herzlia (IL)

(73) Assignee: Avaya Inc., Santa Clara, CA (US)

( * ) Notice: Subject to any disclaimer, the term of this patent is extended or adjusted under 35 U.S.C. 154(b) by 1327 days.

(21) Appl. No.: 12/170,674

(22) Filed: Jul. 10, 2008

(65) Prior Publication Data

US 2010/0008416 A1    Jan. 14, 2010

(51) Int. Cl.
| | |
|---|---|
| H04N 7/12 | (2006.01) |
| H04N 7/15 | (2006.01) |
| H04N 21/2662 | (2011.01) |
| H04N 19/30 | (2014.01) |
| H04N 19/34 | (2014.01) |
| H04N 21/2343 | (2011.01) |

(52) U.S. Cl.
CPC .............. *H04N 7/152* (2013.01); *H04N 19/30* (2014.11); *H04N 19/34* (2014.11); *H04N 21/234327* (2013.01); *H04N 21/2662* (2013.01)

(58) Field of Classification Search
None
See application file for complete search history.

(56) References Cited

U.S. PATENT DOCUMENTS

| | | | |
|---|---|---|---|
| 7,237,032 B2* | 6/2007 | Gemmell | H04L 29/06027 375/E7.012 |
| 2007/0200923 A1* | 8/2007 | Eleftheriadis et al. | 348/14.08 |
| 2007/0206673 A1* | 9/2007 | Cipolli | H04L 1/1607 375/240.1 |
| 2008/0056356 A1* | 3/2008 | Wang et al. | 375/240.12 |
| 2008/0101456 A1 | 5/2008 | Ridge et al. | |
| 2009/0060035 A1* | 3/2009 | He et al. | 375/240.12 |
| 2010/0049865 A1 | 2/2010 | Hannuksela et al. | |

OTHER PUBLICATIONS

U.S. Appl. No. 61/045,539, "Decoding Order Recover in Session Multiplexing". Filed Apr. 16, 2008.

* cited by examiner

*Primary Examiner* — Christopher Crutchfield
*Assistant Examiner* — Thinh Tran

(57) ABSTRACT

Systems, methods, and media for providing selectable video using scalable video coding are provided. In some embodiments, systems for providing selectable video using scalable video coding are provided, the systems comprising: a scalable video coding capable encoder that receives a base content sequence and at least one added content sequence that has different content from the base content stream and that produces at least one SVC stream that includes a basic layer, that corresponds to the base content sequence, and at least one enhanced layer, that corresponds to content in the at least one added content sequence; and a digital processing device that controls whether the at least one enhanced layer in the SVC stream is displayed at a destination for the SVC stream.

26 Claims, 6 Drawing Sheets

SYSTEMS, METHODS, AND MEDIA FOR PROVIDING SELECTABLE VIDEO USING SCALABLE VIDEO CODING

TECHNICAL FIELD

The disclosed subject matter relates to systems, methods, and media for providing selectable video using scalable video coding.

BACKGROUND

Digital video systems have become widely used for varying purposes ranging from entertainment to video conferencing. Many digital video systems require providing different video signals to different recipients. This can be a quite complex process.

For example, traditionally, when different content is desired to be provided to different recipients, a separate video encoder would need to be provided for each recipient. In this way, the video for that recipient would be encoded for that user by the corresponding encoder. Dedicated encoders for individual users may be prohibitively expensive, however, both in terms of processing power and bandwidth.

Accordingly, it is desirable to provide mechanisms for controlling video signals.

SUMMARY

Systems, methods, and media for providing selectable video using scalable video coding are provided. In some embodiments, systems for providing selectable video using scalable video coding are provided, the systems comprising: a scalable video coding capable encoder that receives a base content sequence and at least one added content sequence that has different content from the base content stream and that produces at least one SVC stream that includes a basic layer, that corresponds to the base content sequence, and at least one enhanced layer, that corresponds to content in the at least one added content sequence; and a digital processing device that controls whether the at least one enhanced layer in the SVC stream is displayed at a destination for the SVC stream.

In some embodiments, methods for providing selectable video using scalable video coding are provided, the methods comprising: receiving a base content sequence and at least one added content sequence that has different content from the base content stream; encoding from the base content sequence and the at least one added content sequence at least one SVC stream that includes a basic layer, that corresponds to the base content sequence, and at least one enhanced layer, that corresponds to content in the at least one added content sequence; and controlling whether the at least one enhanced layer in the SVC stream is displayed at a destination for the SVC stream.

In some embodiments, computer-readable media containing computer-executable instructions that, when executed by a processor, cause the processor to perform a method for providing selectable video using scalable video coding are provided, the method comprising: receiving a base content sequence and at least one added content sequence that has different content from the base content stream; encoding from the base content sequence and the at least one added content sequence at least one SVC stream that includes a basic layer, that corresponds to the base content sequence, and at least one enhanced layer, that corresponds to content in the at least one added content sequence; and controlling whether the at least one enhanced layer in the SVC stream is displayed at a destination for the SVC stream.

DETAILED DESCRIPTION

Systems, methods, and media for providing selectable video using scalable video coding are provided. In accordance with various embodiments, two or more video signals can be provided to a scalable video coding (SVC)-capable encoder so that a basic layer and one or more enhanced layers are produced by the encoder. The basic layer can be used to provide base video content and the enhanced layer(s) can be used to modify that base video content with enhanced video content. By controlling when the enhanced layer(s) are available (e.g., by concealing corresponding packets), the availability of the enhanced video content by a video display can be controlled.

A scalable video protocol may include any video compression protocol that allows decoding of different representations of video from data encoded using that protocol. The different representations of video may include different resolutions (spatial scalability), frame rates (temporal scalability), bit rates (SNR scalability), portions of content, and/or any other suitable characteristic. Different representations may be encoded in different subsets of the data, or may be encoded in the same subset of the data, in different embodiments. For example, some scalable video protocols may use layering that provides one or more representations (such as a high resolution image of a user) of a video signal in one layer and one or more other representations (such as a low resolution image of the user) of the video signal in another layer. As another example, some scalable video protocols may split up a data stream (e.g., in the form of packets) so that different representations of a video signal are found in different portions of the data stream. Examples of scalable video protocols may include the Scalable Video Coding (SVC) protocol defined by the Scalable Video Coding Extension of the H.264/AVC Standard (Annex G) from the International Telecommunication Union (ITU), the MPEG2 protocol defined by the Motion Picture Experts Group, the H.263 (Annex O) protocol from the ITU, and the MPEG4 part 2 FGS protocol from the Motion Picture Experts Group, each of which is hereby incorporated by reference herein in its entirety.

Figure 1:
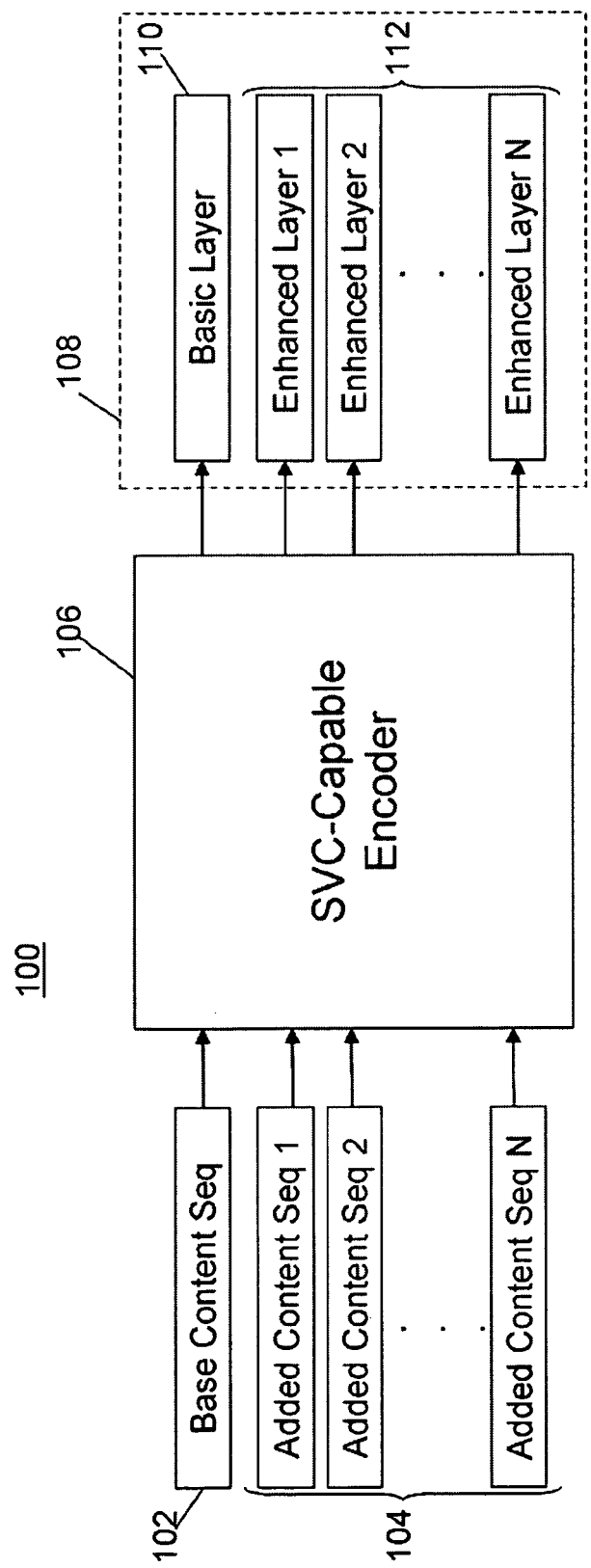
FIG. 1 is a diagram of signals provided to and received from an SVC-capable encoder in accordance with some embodiments of the disclosed subject matter.

Turning to FIG. 1, an illustration of a generalized approach 100 to encoding video in some embodiments is provided. As shown, a base content sequence 102 can be supplied to an SVC-capable encoder 106. One or more added content sequences 1-N 104 can also be supplied to the SVC-capable encoder. In response to receiving these sequences, the encoder can then provide an SVC stream 108 containing a basic layer 110 and one or more enhanced layers 112.

Base content sequence 102 can be any suitable video signal containing any suitable content. For example, in some embodiments, base content sequence can be video content that is filly or partially in a low-resolution format. This low-resolution video content may be suitable as a teaser to entice a viewer to purchase a higher resolution version of the content, as a more particular example. As another example, in some embodiments, base content sequence can be video content that is fully or partially distorted to hide prevent complete viewing of the video content. As another example, in some embodiments, base content sequence can be video content that is missing text (such as close captioning, translations, etc.) or graphics (such as logos, icons, advertisements, etc.) that may be desirable for some viewers.

Added content sequence(s) 104 can be any suitable content that provides a desired total content sequence. For example, when base content sequence 102 includes low-resolution content, added content sequence(s) 104 can be a higher resolution sequence of the same content. As another example, when base content sequence 102 is video content that is missing desired text or graphics, added content sequence(s) 104 can be the video content with the desired text or graphics.

In some embodiments, the resolution and other parameters of the base content sequence and added content sequence(s) can be identical. In some embodiments, in case that added content is restricted to a small part of a display screen (e.g., as in the case of a logo or a caption), it may be beneficial to position the content in the added content sequence, so that is aligned to macro block (MB) boundaries. This may improve the visual quality of the one or more enhancements layers encoded by the SVC encoder.

SVC-capable encoder 106 can be any suitable SVC-capable encoder for providing an SVC stream. For example, in some embodiments, SVC-capable encoder 106 can implement a layered approach (similar to Coarse Grained Scalability) in which two layers are defined (basic and enhanced), the spatial resolution factor is set to one, intra prediction is applied only to the basic layer, the quantization error between a low-quality sequence and a higher-quality sequence is encoded using residual coding, and motion data, up-sampling, and/or other trans-coding is not performed. As another example, SVC-capable encoder 106 can be implemented using the Joint Scalable Video Model (JSVM) software from the Scalable Video Coding (SVC) project of the Joint Video Team (JVT) of the ISO/IEC Moving Pictures Experts Group (MPEG) and the ITU-T Video Coding Experts Group (VCEG). Examples of configuration files for configuring the JSVM software are illustrated in the Appendix below. Any other suitable configuration for an SVC-capable encoder can additionally or alternatively be used.

As mentioned above, SVC-capable encoder 106 can provide SVC stream 108, which can include basic layer 110 and one or more enhanced layers 112. The basic layer, when decoded, can provide the signal in base content sequence 102. The one or more enhanced layers 112, when decoded, can provide any suitable content that, when combined with basic layer 110, can be used to provide a desired video content. Decoding of the SVC stream can be performed by any suitable SVC decoder, and the basic layer can be decoded by any suitable AVC decoder in some embodiments.

While FIG. 1 illustrates a single SVC stream 108 with one basic layer 110 and one or more enhanced layers 112, in some embodiments multiple SVC streams 108 can be produced by SVC-capable encoder 106. For example, when three enhanced layers 112 are produced, three SVC streams 108 can be produced wherein each of the streams includes the basic layer and a respective one of the enhanced layers. As another example, when multiple SVC streams are produced, any one of more of the streams can include more than one enhanced layer in addition to a basic layer.

Figure 2:
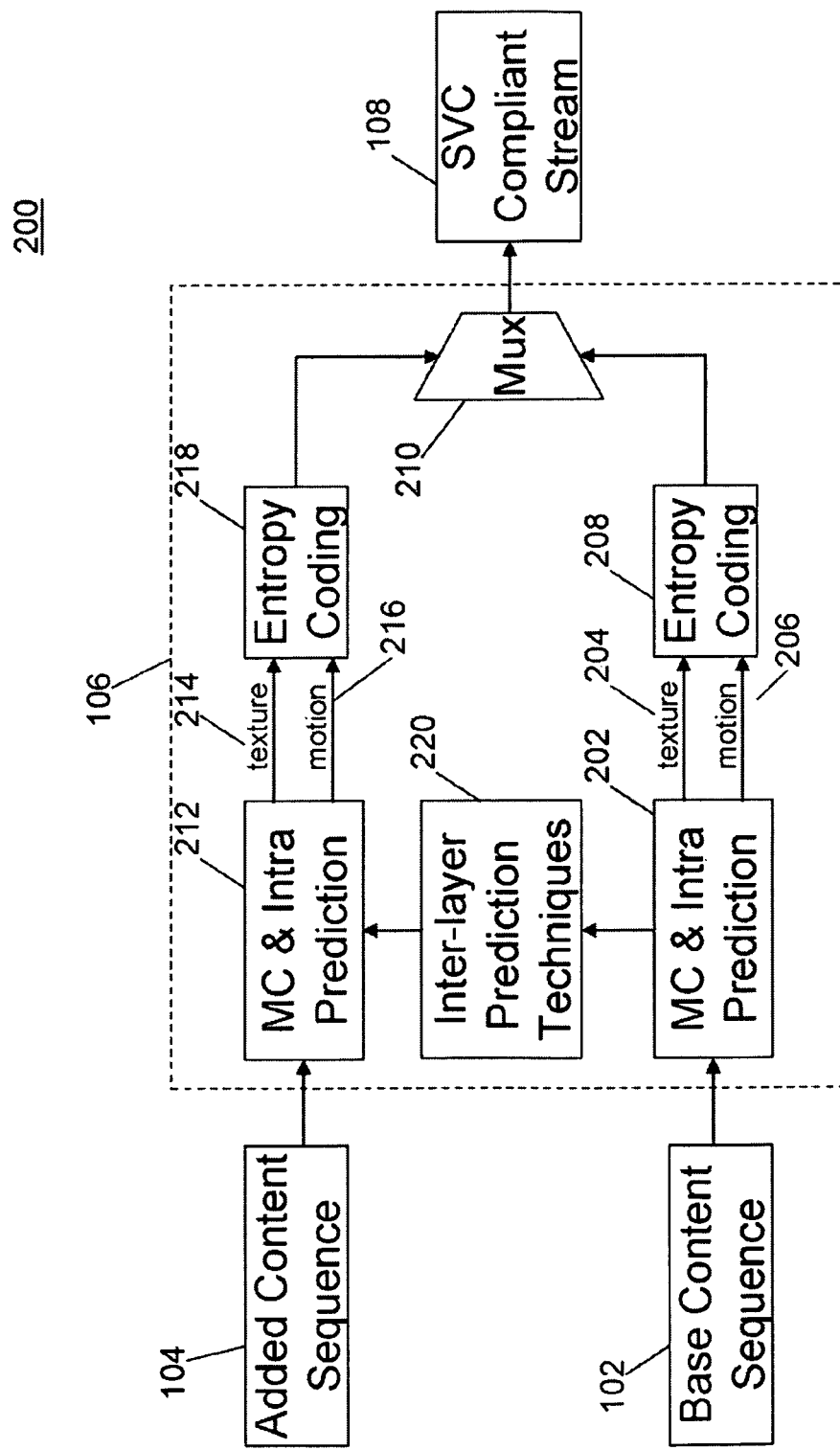
FIG. 2 is a diagram of an SVC-capable encoder in accordance with some embodiments of the disclosed subject matter.

Turning to FIG. 2, a more detailed illustration of an SVC-capable encoder 106 that can be used in some embodiments is provided. As shown, SVC-capable encoder 106 can receive a base content sequence 102 and an added-content sequence 104. The base content sequence 102 can then be processed by motion compensation and intra prediction mechanism 202. This mechanism can perform any suitable SVC motion compensation and intra prediction processes. A residual texture signal 204 (produced by motion compensation and intra prediction mechanism 202) may then be quantized and provided together with the motion signal 206 to entropy coding mechanism 208. Entropy coding mechanism 208 may then perform any suitable entropy coding function and provide the resulting signal to multiplexer 210.

Data from motion compensation and intra prediction process 202 can then be used by inter-layer prediction techniques 220, along with added content sequence 104, to drive motion compensation and prediction mechanism 212. Any suitable data from motion compensation and intra prediction mechanism 202 can be used. Any suitable SVC inter-layer prediction techniques 220 and any suitable SVC motion compensation and intra prediction processes in mechanism 212 can be used. A residual texture signal 214 (produced by motion compensation or intra prediction mechanisms 212) may then be quantized and provided together with the motion signal 216 to entropy coding mechanism 218. Entropy coding mechanism 218 may then perform any suitable entropy coding function and provide the resulting signal to multiplexer 210. Multiplexer 210 can then combine the resulting signals from entropy coding mechanisms 208 and 218 as an SVC compliant stream.

Side information can also be provided to encoder 106 in some embodiments. This side information can identify, for example, a region of an image where content corresponding to a difference between the base content sequence and an added content sequence is (e.g., where a logo or text may be located). The side information can then be used in a mode decision step within block 212 to determine whether to process the added content sequence or not.

Figure 3:
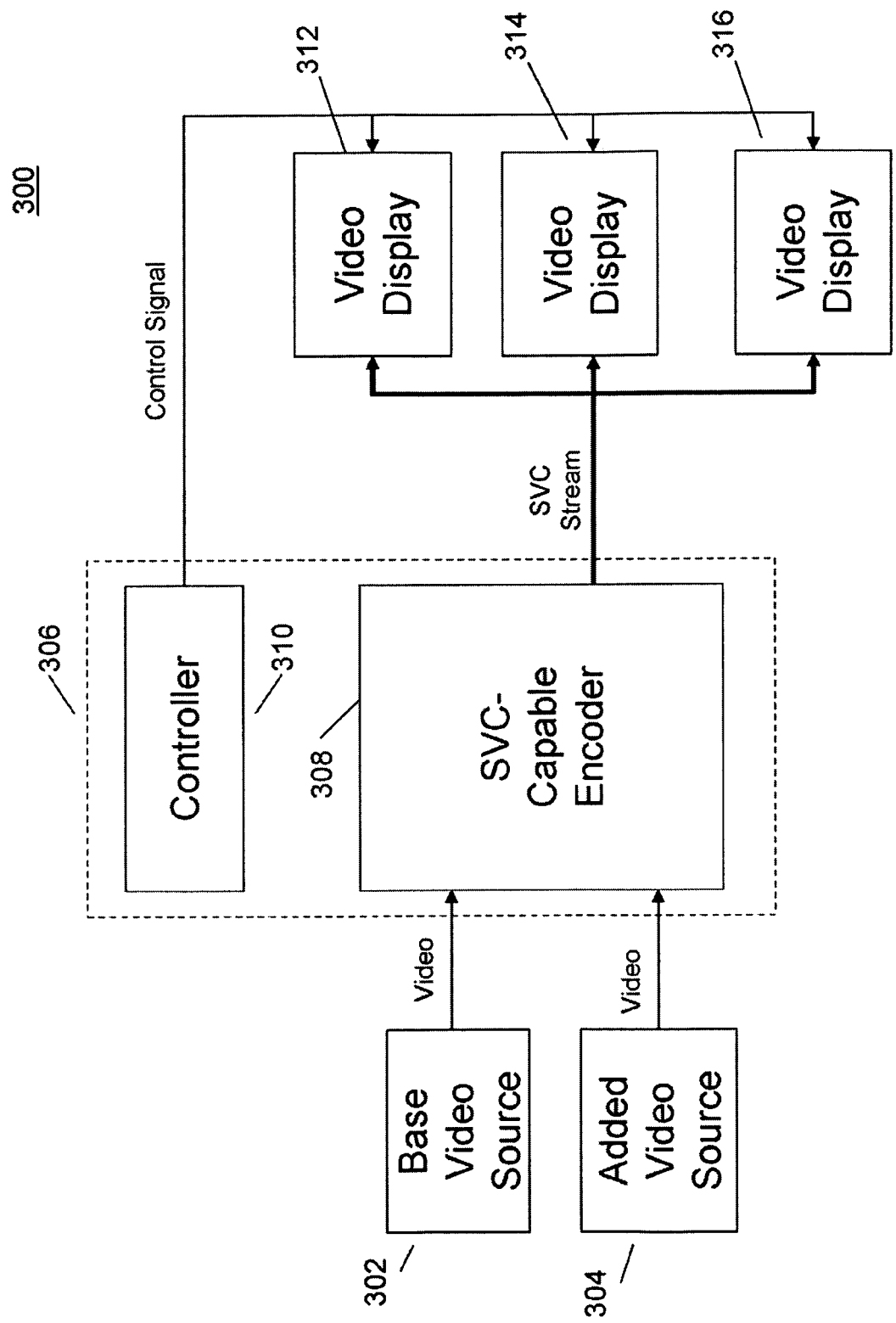
FIG. 3 is a diagram of a video distribution system in accordance with some embodiments of the disclosed subject matter.

FIG. 3 illustrates an example of a video distribution system 300 in accordance with some embodiments. As shown, a distribution controller 306 can receive a base content sequence as video from a base video source 302 and an added content sequence as video from an added video source 304. These sequences can be provided to an SVC-capable encoder 308 that is part of distribution controller 306. The SVC capable encoder 308 can then produce an SVC stream that includes a base layer and at least one enhanced layer as described above, and provides this stream to one or more video displays 312, 314, and 316. The distribution controller can also include a controller 310 that provides control signal to the one or more video displays 312, 314, and 316. This control signal can indicate what enhanced content (if any) a video display is to display.

Additionally or alternatively to using a controller 310 that is part of controller 306 and is coupled to displays 312, 314, and 316, in some embodiments, a separate component (e.g., such as a network component such as a router, gateway, etc.) may be provided between encoder 308 and displays 312, 314, and 316 that contains a controller (like controller 310 for example) that determines what portions (e.g., layers) of the SVC stream can pass through to displays 312, 314, and 316.

Controller 310, or a similar mechanism in a network component, display, endpoint, etc., may use any suitable software and/or hardware to control which enhancement layers are presented and/or which packets of an SVC stream are concealed. For example, these devices may include a digital processing device that may include one or more of a microprocessor, a processor, a controller, a microcontroller, a programmable logic device, and/or any other suitable hardware and/or software for controlling which enhancement layers are presented and/or which packets of an SVC stream are concealed.

Figure 4:
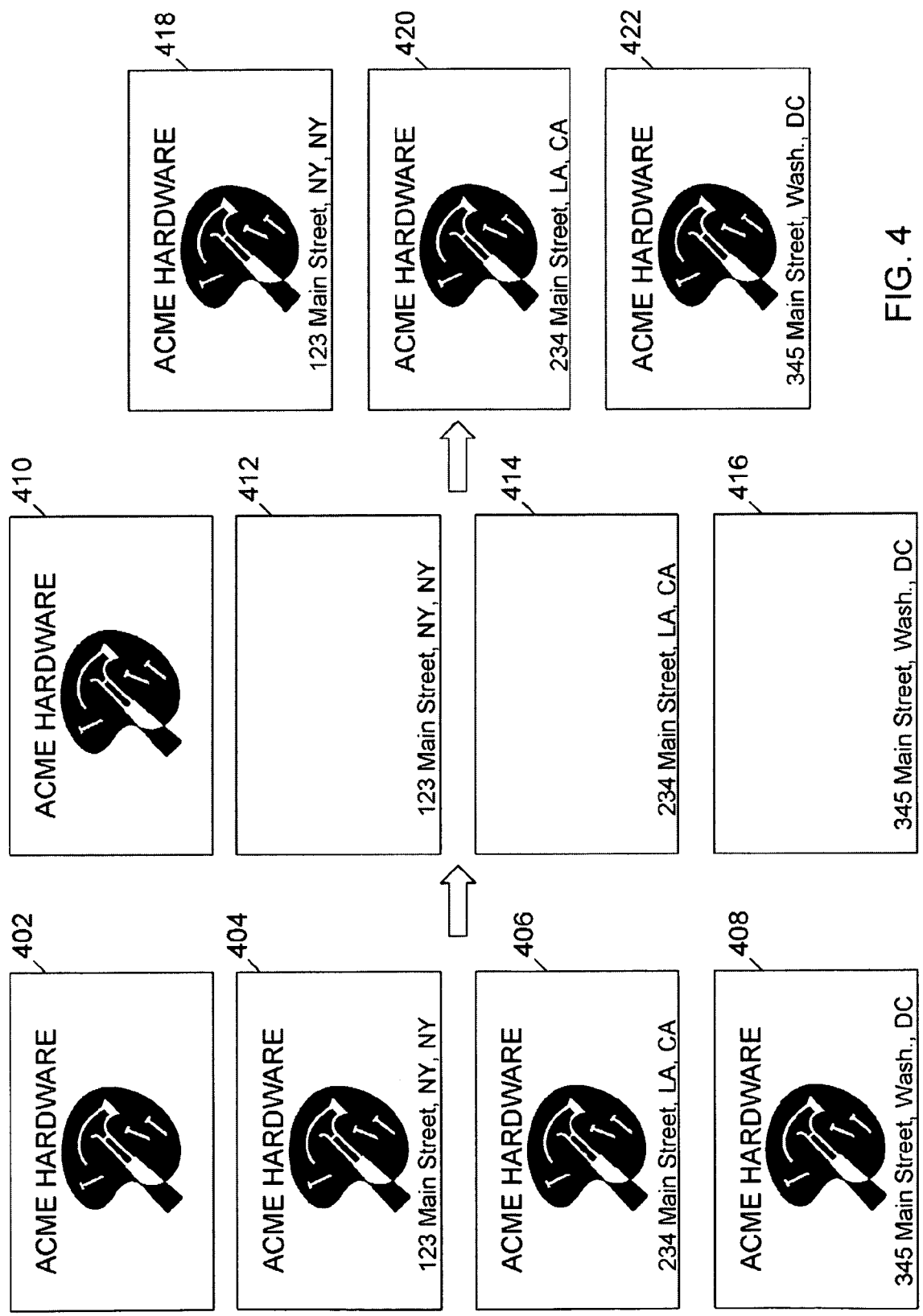
FIG. 4 is a diagram illustrating the combination of basic and enhanced layers in accordance with some embodiments of the disclosed subject matter.

Turning to FIG. 4, an example of how such a distribution system may be used in some embodiments is shown. As illustrated, a base content sequence 402 and three added content sequences 404, 406, and 408 may be provided to encoder 308. The encoder may then produce basic layer 410 and enhancement layers 412, 414, and 416. These layers may then be formed into three SVC streams; one with layers 410 and 412; another with layers 410 and 414; and yet another with layers 410 and 416. Each of the three SVC streams may be addressed to a different one of video display 312, 314, and 316 and presented as shown in displays 418, 420, and 422, respectively.

Additionally or alternatively to providing three SVC streams, a single stream may be generated and only selected portions (e.g., packets) utilized at each of video displays 312, 314, and 316. The selection of portions may be performed at the displays or at a component between the encoder and the displays as described above in some embodiments.

Figure 5:
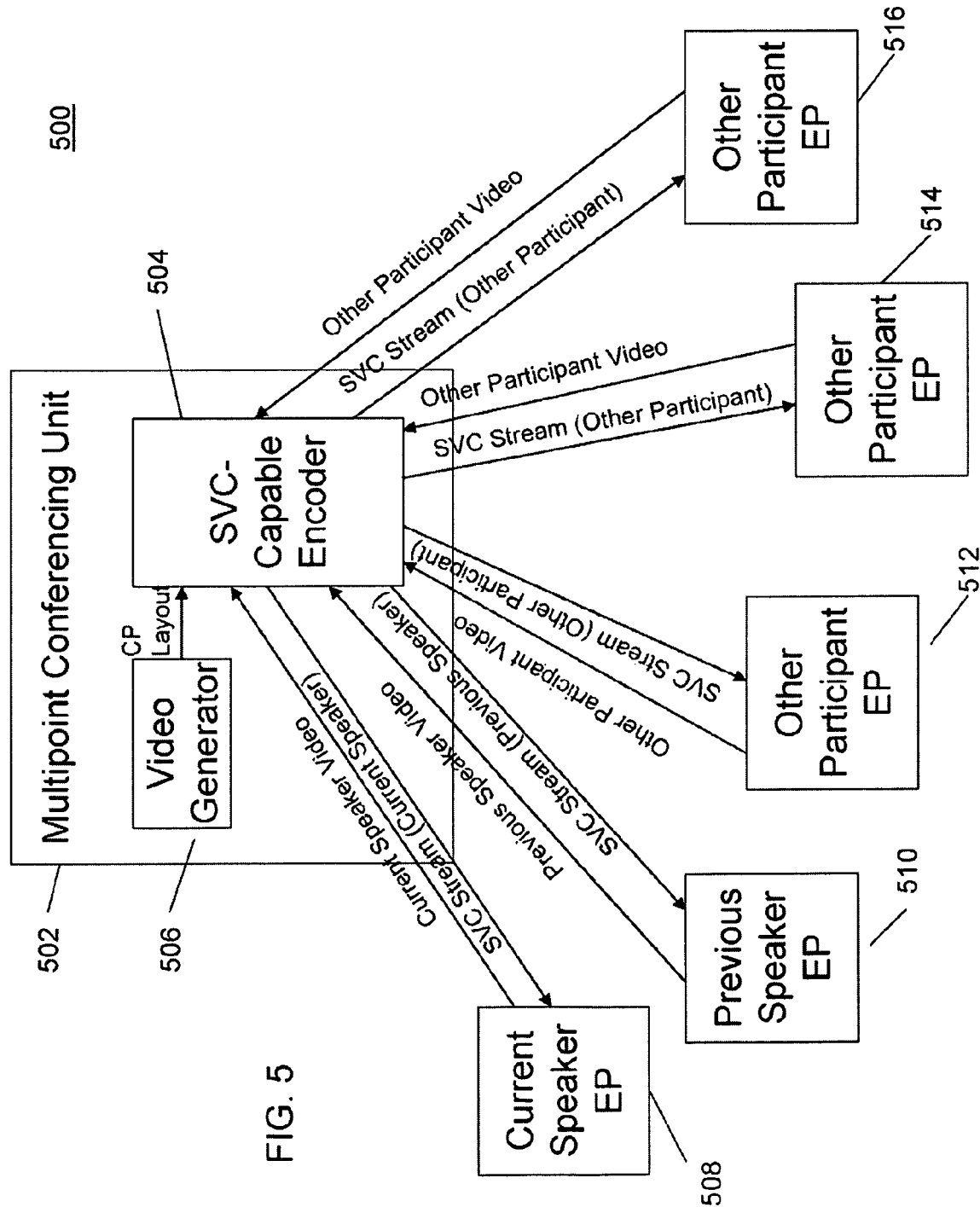
FIG. 5 is a diagram of a video conferencing system in accordance with some embodiments of the disclosed subject matter.
Figure 6:
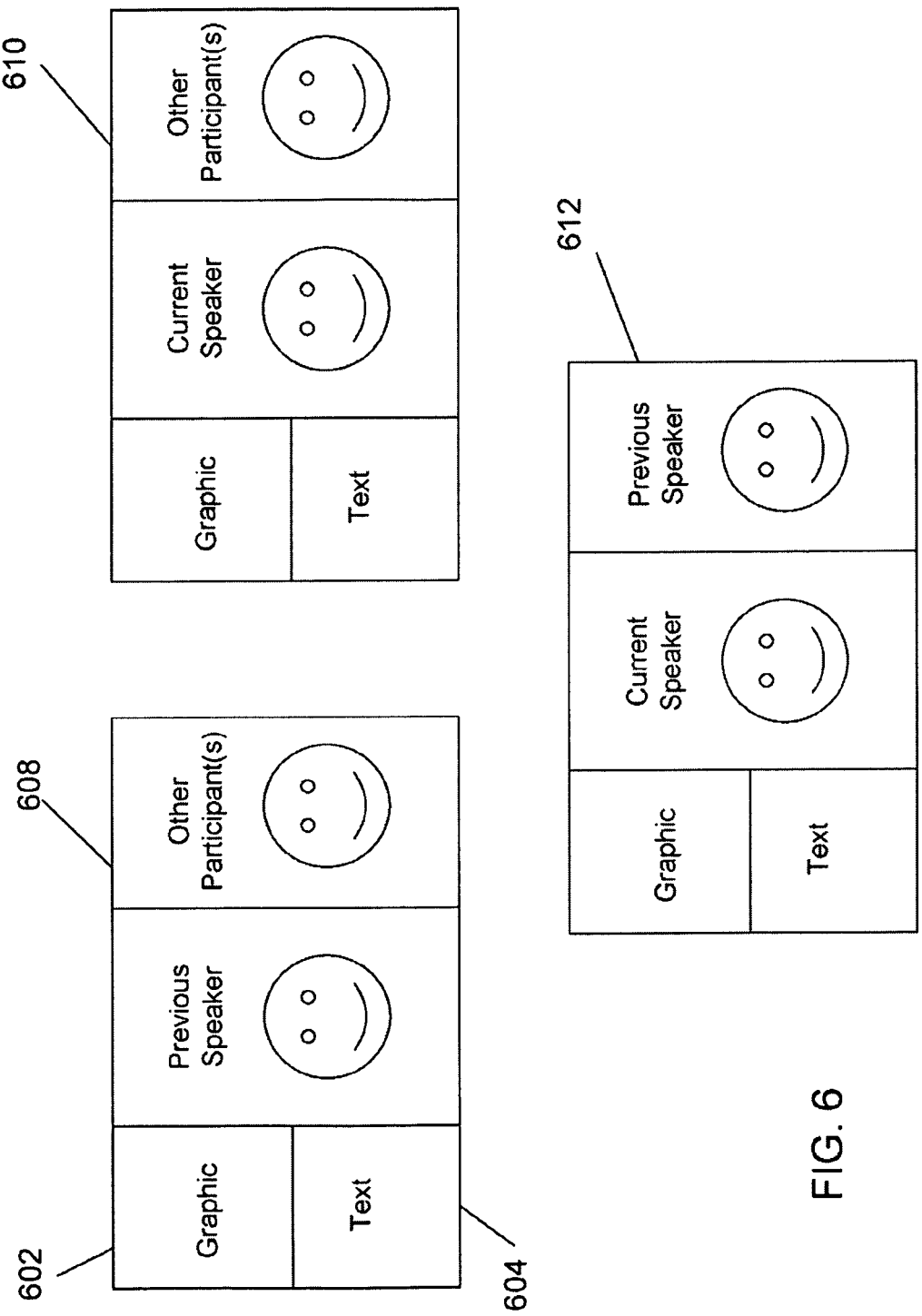
FIG. 6 is a diagram of different user end point displays in accordance with some embodiments of the disclosed subject matter.

FIGS. 5 and 6 illustrate a video conferencing system 500 in accordance with some embodiments. As shown, system 500 includes a multipoint conferencing unit (MCU) 502. MCU 502 can include an SVC-capable encoder 504 and a video generator 506. Video generator 506 may generate a continuous presence (CP) layout in any suitable fashion and provide this layout as a base content sequence to SVC-capable encoder 504. The SVC capable encoder may also receive as added content sequences current speaker video, previous speaker video, and other participant video from current speaker end point 508, previous speaker end point 510, and other participant end points 512, 514, and 516, respectively. SVC streams can then be provided from encoder 504 to current speaker end point 508, previous speaker end point 510, and other participant end points 512, 514, and 516 and be controlled as described below in connection with FIG. 6.

As illustrated in FIG. 6, the display on current speaker end point 508 may be controlled so that the user sees a CP layout from the basic layer (which may include graphics 602 and text 604) along with enhanced layers corresponding to the previous speaker and one or more of the other participants, as shown in display 608. The display on previous speaker end point 510 may be controlled so that the user sees a CP layout from the basic layer along with enhanced layers corresponding to the current speaker and one or more of the other participants, as shown in display 610. The display on other participant end points 512, 514, and 516 may be controlled so that the user sees a CP layout from the basic layer along with enhanced layers corresponding to the current speaker and the previous speaker, as shown in display 612. In this way, no user of an endpoint sees video of himself or herself.

Although FIG. 5 illustrates different SVC streams going from the SVC-capable encoder to endpoints 508, 510, and 512, 514, and 516, in some embodiments, these streams may all be identical and a separate control signal (not shown) for selecting which enhanced layers are presented on each end point may be provided. Additionally or alternatively, the SVC-capable encoder or any other suitable component may select to provide only certain enhanced layers as part of SVC stream based on the destination for the streams using packet concealment or any other suitable technique.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

APPENDIX

An example of a "encoder.cfg" configuration file that may be used with a JSVM 9.1 encoder in some embodiments is shown below:

```
# Scalable H.264/AVC Extension Configuration File
#============================== GENERAL ==============================
    OutputFile          test.264  # Bitstream file
    FrameRate           30        # Maximum frame rate [Hz]
    MaxDelay            0         # Maximum structural delay [ms]
                                  # (required for interactive
                                  # communication)
    FramesToBeEncoded   30        # Number of frames (at input frame rate)
    CgsSnrRefinement    1         # (0:SNR layers as CGS, 1:SNR layers
                                  #  as MGS)
    EncodeKeyPictures   1         # key pictures at temp. level 0
                                  # [0:FGS only, 1:FGS&MGS,
                                  #  2:always(useless)]
    MGSControl          1         # (0:ME+MC using current layer,
                                  #  1:ME using EL ref. pics, 2:ME+MC
                                  #  using EL ref. pics)
    MGSKeyPicMotRef     1         # motion refinement for MGS key pics
                                  # (0:off, 1:one)
```

```
#============================== MCTF ==============================
GOPSize                 1       # GOP Size (at maximum frame rate) (no
                                # temporal scalability)
IntraPeriod            -1       # Intra Period
NumberReferenceFrames   1       # Number of reference pictures
BaseLayerMode           1       # Base layer mode (0:AVC w large DPB,
                                #   1:AVC compatible, 2:AVC w subseq
                                #   SEI)
#============================== MOTION SEARCH ==============================
SearchMode              4       # Search mode (0:BlockSearch,
                                # 4:FastSearch)
SearchFuncFullPel       0       # Search function full pel
                                #   (0:SAD, 1:SSE, 2:HADAMARD, 3:SAD-
                                #     YUV)
SearchFuncSubPel        0       # Search function sub pel
                                #   (0:SAD, 1:SSE, 2:HADAMARD)
SearchRange            16       # Search range (Full Pel)
BiPredIter              2       # Max iterations for bi-pred search
IterSearchRange         2       # Search range for iterations (0:
                                #   normal)
#============================== LOOP FILTER ==============================
LoopFilterDisable       0       # Loop filter idc (0: on, 1: off, 2:
                                #   on except for slice boundaries)
LoopFilterAlphaC0Offset 0       # AlphaOffset(-6..+6): valid range
LoopFilterBetaOffset    0       # BetaOffset (-6..+6): valid range
#============================== LAYER DEFINITION ==============================
NumLayers               2       # Number of layers
LayerCfg                base_content.cfg   # Layer configuration file
LayerCfg                added_content.cfg  # Layer configuration file
#LayerCfg               ..\..\..\data\layer2.cfg # Layer configuration file
#LayerCfg               ..\..\..\data\layer3.cfg # Layer configuration file
#Layercfg               ..\..\..\data\layer4.cfg # Layer configuration file
#LayerCfg               layer5.cfg # Layer configuration file
#LayerCfg               layer6.cfg # Layer configuration file
#LayerCfg               ..\..\..\data\layer7.cfg # Layer configuration file
PreAndSuffixUnitEnable  1       # Add prefix and suffix unit (0: off,
                                # 1: on) shall always be on in SVC
                                # contexts (i.e. when there are
                                # FGS/CGS/spatial enhancement layers)
MMCOBaseEnable          1       # MMCO for base representation (0: off,
                                # 1: on)
TLNestingFlag           0       # Sets the temporal level nesting flag
(0: off, 1: on)
TLPicIdxEnable          0       # Add picture index for the lowest
temporal level (0: off, 1: on)
#============================== RCDO ==============================
RCDOBlockSizes          1       # restrict block sizes for MC
                                # (0:off, 1:in EL, 2:in all layers)
RCDOMotionCompensationY 1       # simplified MC for luma
                                # (0:off, 1:in EL, 2:in all layers)
RCDOMotionCompensationC 1       # simplified MC for chroma
                                # (0:off, 1:in EL, 2:in all layers)
RCDODeblocking          1       # simplified deblocking
                                # (0:off, 1:in EL, 2:in all layers)
#============================== HRD ==============================
EnableNalHRD            0
EnableVclHRD            0
```

An example of a "base_content.cfg" configuration file (as referenced in the "encoder.cfg" file) that may be used with a JSVM 9.1 encoder in some embodiments is shown below:

```
# Layer Configuration File
#============================== INPUT / OUTPUT ==============================
SourceWidth       352              # Input   frame width
SourceHeight      288              # Input   frame height
FrameRateIn       30               # Input   frame rate [Hz]
FrameRateOut      30               # Output frame rate [Hz]
InputFile         base_content.yuv # Input   file
ReconFile         rec_layer0.yuv   # Reconstructed file
SymbolMode        0                # 0=CAVLC, 1=CABAC
```

-continued

```
#============================ CODING ============================
ClosedLoop      1           # Closed-loop control
                            # (0,1:at H rate, 2: at L+H rate)
FRExt           0           # FREXT mode (0:off, 1:on)
MaxDeltaQP      0           # Max. absolute delta QP
QP              32.0        # Quantization parameters
NumFGSLayers    0           # Number of FGS layers
                            # ( 1 layer - ~ delta QP = 6 )
FGSMotion       0           # motion refinement in FGS layers
(0:off, 1:on)
#============================ CONTROL ============================
MeQP0           32.00  # QP for motion estimation / mode decision (stage 0)
MeQP1           32.00  # QP for motion estimation / mode decision (stage 1)
MeQP2           32.00  # QP for motion estimation / mode decision (stage 2)
MeQP3           32.00  # QP for motion estimation / mode decision (stage 3)
MeQP4           32.00  # QP for motion estimation / mode decision (stage 4)
MeQP5           32.00  # QP for motion estimation / mode decision (stage 5)
InterLayerPred  0      # Inter-layer Prediction (0: no, 1: yes, 2:adaptive)
BaseQuality     3      # Base quality level (0, 1, 2, 3) (0: no, 3, all)
```

An example of a "added_content.cfg" configuration file (as referenced in the "encoder.cfg" file) that may be used with a JSVM 9.1 encoder in some embodiments is shown below:

```
# Layer Configuration File
#============================ INPUT / OUTPUT ============================
SourceWidth     352              # Input    frame width
SourceHeight    288              # Input    frame height
FrameRateIn     30               # Input    frame rate [Hz]
FrameRateOut    30               # Output   frame rate [Hz]
InputFile       added_content.yuv # Input   file
ReconFile       rec_layer0.yuv   # Reconstructed file
SymbolMode      0                # 0=CAVLC, 1=CABAC
#============================ CODING ============================
ClosedLoop      1           # Closed-loop control (0,1:at H rate, 2: at L+H rate)
FRExt           0           # FREXT mode (0:off, 1:on)
MaxDeltaQP      0           # Max. absolute delta QP
QP              32.0        # Quantization parameters
NumFGSLayers    0           # Number of FGS layers ( 1 layer - ~ delta QP = 6 )
FGSMotion       0           # motion refinement in FGS layers (0:off, 1:on)
#============================ CONTROL ============================
MeQP0           32.00  # QP for motion estimation / mode decision (stage 0)
MeQP1           32.00  # QP for motion estimation / mode decision (stage 1)
MeQP2           32.00  # QP for motion estimation / mode decision (stage 2)
MeQP3           32.00  # QP for motion estimation / mode decision (stage 3)
MeQP4           32.00  # QP for motion estimation / mode decision (stage 4)
MeQP5           32.00  # QP for motion estimation / mode decision (stage 5)
InterLayerPred  0      # Inter-layer Prediction (0: no, 1: yes, 2:adaptive)
BaseQuality     3      # Base quality level (0, 1, 2, 3) (0: no, 3, all)
```

What is claimed is:

1. A system for providing selectable video using scalable video coding, comprising:
   a scalable video coding capable encoder that receives a base content sequence and a plurality of added content sequences that have different content portions from the base content stream, that produces an SVC stream that includes a basic layer, that corresponds to the base content sequence, and a plurality of enhanced layers, that correspond to content portions in the plurality of added content sequences, wherein a first of the plurality of added content sequences corresponds to a first destination and a second of the plurality of added content sequences corresponds to a second destination, and provides the SVC stream to the first destination and the second destination; and
   a digital processing device that provides a control signal to the first destination and the second destination which provides an indication of which of said enhanced layers are displayed at one of the first destination and the second destination;
   wherein the indication causes a first of the plurality of enhanced layers in the SVC stream to be selected for display at the first destination for the SVC stream and a second of the plurality of enhanced layers in the SVC stream to be selected for display at the second destination for the SVC stream.

2. The system of claim 1, further comprising an SVC decoder that receives and decodes the SVC stream.

3. The system of claim 2, wherein the SVC decoder complies with the Scalable Video Coding Extension of the H.264/AVC Standard.

4. The system of claim 1, wherein said digital processing device resides in said first destination.

5. The system of claim 1, wherein the first of the plurality of added content sequences includes text specific to a first location and the second of the plurality of added content sequences includes text specific to a second location.

6. The system of claim 1, wherein at least one of the plurality of added content sequences includes graphics.

7. The system of claim 1, wherein the digital processing device causes the first of the plurality of enhanced layers in the SVC stream to be displayed at the first destination for the SVC stream by concealing packets associated with the plurality of enhanced-layers.

8. The system of claim 1, wherein the digital processing device causes the first of the plurality of enhanced layers in the SVC stream to be displayed at the first destination for the SVC stream by providing the control signal to the first destination.

9. The system of claim 1, wherein the basic layer and at least one of the plurality of enhanced layers are used to form a continuous presence layout for a video conference.

10. A method for providing selectable video using scalable video coding, comprising:
receiving a base content sequence and a plurality of added content sequences that have different content portions from the base content stream;
encoding from the base content sequence and the plurality of added content sequences an SVC stream that includes a basic layer, that corresponds to the base content sequence, and a plurality of enhanced layers, that correspond to content portions in the plurality of added content sequences, wherein a first of the plurality of added content sequences corresponds to a first destination and a second of the plurality of added content sequences corresponds to a second destination;
sending the SVC stream to the first destination and the second destination;
sending a control signal to the first destination and the second destination to provide an indication of which of said enhanced layers to display at one of said first destination and said second destination; and
based on said control signal, selecting a first of the plurality of enhanced layers in the SVC stream to be displayed at the first destination for the SVC stream and a second of the plurality of enhanced layers in the SVC stream to be displayed at the second destination for the SVC stream.

11. The method of claim 10, further comprising receiving and decoding the SVC stream.

12. The method of claim 11, wherein the decoding complies with the Scalable Video Coding Extension of the H.264/AVC Standard.

13. The method of claim 10, wherein said control signal emanates from said first destination.

14. The method of claim 10, wherein the first of the plurality of added content sequences includes text specific to a first location and the second of the plurality of added content sequences includes text specific to a second location.

15. The method of claim 10, wherein at least one of the plurality of added content sequences includes graphics.

16. The method of claim 10, wherein the causing causes the first of the plurality of enhanced layers in the SVC stream to be displayed at the first destination for the SVC stream by concealing packets associated with the plurality of enhanced layers.

17. The method of claim 10, wherein the causing causes the first of the plurality of enhanced layers in the SVC stream to be displayed at the first destination for the SVC stream by providing the control signal to the first destination.

18. The method of claim 10, wherein the basic layer and at least one of the plurality of enhanced layers are used to form a continuous presence layout for a video conference.

19. A non-transitory computer-readable medium containing computer-executable instructions that, when executed by a processor, cause the processor to perform a method for providing selectable video using scalable video coding, the method comprising:
receiving a base content sequence and a plurality of added content sequences that have different content portions from the base content stream;
encoding from the base content sequence and the plurality of added content sequences an SVC stream that includes a basic layer, that corresponds to the base content sequence, and a plurality of enhanced layers, that correspond to content portions in the plurality of added content sequences, wherein a first of the plurality of added content sequences corresponds to a first destination and a second of the plurality of added content sequences corresponds to a second destination;
sending the SVC stream to the first destination and the second destination;
sending a control signal to the first destination and the second destination to provide an indication of which of said enhanced layers to display at one of said first destination and said second destination; and
based on said control signal, selecting a first of the plurality of enhanced layers in the SVC stream to be displayed at the first destination for the SVC stream and a second of the plurality of enhanced layers in the SVC stream to be displayed at the second destination for the SVC stream.

20. The non-transitory computer-readable medium of claim 19, wherein the method further comprises receiving and decoding the SVC stream.

21. The non-transitory computer-readable medium of claim 20, wherein the decoding complies with the Scalable Video Coding Extension of the H.264/AVC Standard.

22. The non-transitory computer-readable medium of claim 19, wherein the first of the plurality of added content sequences includes text specific to a first location and the second of the plurality of added content sequences includes text specific to a second location.

23. The non-transitory computer-readable medium of claim 19, wherein at least one of the et least one plurality of added content sequences includes graphics.

24. The non-transitory computer-readable medium of claim 19, wherein the causing causes the first of the at least one plurality of enhanced layers in the SVC stream to be displayed at the first destination for the SVC stream by concealing packets associated with the plurality of enhanced layers.

25. The non-transitory computer-readable medium of claim 19, wherein the causing causes the first of the plurality of enhanced layers in the SVC stream to be displayed at the first destination for the SVC stream by providing said control signal to the first destination.

26. The non-transitory computer-readable medium of claim 19, wherein the basic layer and at least one of the plurality of enhanced layers are used to form a continuous presence layout for a video conference.

* * * * *